US006891551B2

(12) United States Patent
Keely et al.

(10) Patent No.: US 6,891,551 B2
(45) Date of Patent: May 10, 2005

(54) SELECTION HANDLES IN EDITING ELECTRONIC DOCUMENTS

(75) Inventors: Leroy B. Keely, Portola Valley, CA (US); Marieke Iwema, Renton, WA (US); Susanne Alysia Clark Cazzanti, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 434 days.

(21) Appl. No.: 09/768,171

(22) Filed: Jan. 24, 2001

(65) Prior Publication Data

US 2002/0097270 A1 Jul. 25, 2002

Related U.S. Application Data

(60) Provisional application No. 60/247,973, filed on Nov. 10, 2000.

(51) Int. Cl.[7] .............................................. G06F 13/00
(52) U.S. Cl. ........................ 345/762; 345/765; 345/810
(58) Field of Search ................................. 345/762, 765, 345/810, 841, 840, 744, 808, 835, 839, 764, 781, 784

(56) References Cited

U.S. PATENT DOCUMENTS

| 5,146,552 A | 9/1992 | Cassorla et al. |
| 5,239,466 A | 8/1993 | Morgan et al. |
| 5,434,965 A | 7/1995 | Matheny et al. |
| 5,473,742 A | 12/1995 | Polyakov et al. |
| 5,517,578 A | 5/1996 | Altman et al. |
| 5,572,643 A | 11/1996 | Judson |
| 5,613,019 A | 3/1997 | Altman et al. |
| 5,625,833 A | 4/1997 | Levine et al. |
| 5,632,022 A | 5/1997 | Warren et al. |
| 5,680,636 A | 10/1997 | Levine et al. |
| 5,682,439 A | 10/1997 | Beernink et al. |
| 5,687,331 A | 11/1997 | Volk et al. |
| 5,717,879 A | 2/1998 | Moran et al. |
| 5,727,129 A | 3/1998 | Barrett et al. |
| 5,729,687 A | 3/1998 | Rothrock et al. |
| 5,737,599 A | 4/1998 | Rowe et al. |
| 5,745,116 A | 4/1998 | Pisutha-Arnold |
| 5,760,773 A * | 6/1998 | Berman et al. ............. 345/808 |
| 5,790,818 A | 8/1998 | Martin |
| 5,801,687 A | 9/1998 | Peterson et al. |
| 5,821,925 A | 10/1998 | Carey et al. |
| 5,832,263 A | 11/1998 | Hansen et al. |
| 5,838,914 A | 11/1998 | Carleton et al. |
| 5,845,262 A | 12/1998 | Nozue et al. |
| 5,877,757 A | 3/1999 | Baldwin et al. |
| 5,893,126 A | 4/1999 | Drews et al. |
| 5,893,132 A | 4/1999 | Huffman et al. |

(Continued)

FOREIGN PATENT DOCUMENTS

| EP | 0 902 379 A2 | 3/1999 |
| EP | 1 016 983 A2 | 7/2000 |
| WO | WO 96/20908 | 7/1996 |
| WO | WO 97/22109 | 6/1997 |
| WO | WO 98/06054 | 2/1998 |
| WO | WO 87/01481 | 3/1998 |
| WO | WO 98/09446 | 3/1998 |
| WO | WO 99/49383 | 9/1999 |

OTHER PUBLICATIONS

"Adobe Acrobat 3.0 Reader Online Guide", Adobe Systems, Inc., pp. 1–110.

(Continued)

Primary Examiner—Cao Nguyen
(74) Attorney, Agent, or Firm—Banner & Witcoff, Ltd.

(57) ABSTRACT

A computer system and method for highlighting and selecting elements of electronic documents is disclosed. In one embodiment, a selection area identifies an initial selection of data, and one or more selection handles appear on the selection area to allow dynamic resizing of the selection area to select a larger or smaller portion of data or number of items.

20 Claims, 10 Drawing Sheets

---

In the Fig. 3 example, the English language is assumed, and the increase/decrease directions are determined based on the directional flow of the English language. In this directional flow, the up/down direction is resolved first, such that, for example, dragging to the left above the selection increases the selection area, but dragging to the left below the selection decreases the selection area. Such directional logic is dependent on the directional flow of the language, and will be readily apparent to one of ordinary skill in the art.

602b  602a

601

U.S. PATENT DOCUMENTS

| | | |
|---|---|---|
| 5,918,236 A | 6/1999 | Wical |
| 5,920,694 A | 7/1999 | Carleton et al. |
| 5,931,912 A | 8/1999 | Wu et al. |
| 5,933,140 A | 8/1999 | Strahorn et al. |
| 5,937,416 A | 8/1999 | Menzel |
| 5,948,040 A | 9/1999 | DeLorme et al. |
| 5,950,214 A | 9/1999 | Rivette et al. |
| 5,978,818 A | 11/1999 | Lin |
| 5,983,248 A | 11/1999 | DeRose et al. |
| 5,986,665 A | 11/1999 | Wrey et al. |
| 6,011,537 A | 1/2000 | Slotznick |
| 6,012,055 A | 1/2000 | Campbell et al. |
| 6,018,334 A | 1/2000 | Eckerberg et al. |
| 6,018,342 A | 1/2000 | Bristor |
| 6,018,742 A | 1/2000 | Herbert, III |
| 6,035,330 A | 3/2000 | Astiz et al. |
| 6,049,812 A | 4/2000 | Bertram et al. |
| 6,052,514 A | 4/2000 | Gill et al. |
| 6,054,990 A | 4/2000 | Tran |
| 6,081,829 A | 6/2000 | Sidana |
| 6,088,481 A | 7/2000 | Okamoto et al. |
| 6,091,930 A | 7/2000 | Mortimer et al. |
| 6,094,197 A | 7/2000 | Buxton et al. |
| 6,118,437 A | 9/2000 | Fleck et al. |
| 6,122,649 A | 9/2000 | Kanerva et al. |
| 6,128,007 A | 10/2000 | Seybold |
| 6,157,381 A | 12/2000 | Bates et al. |
| 6,181,344 B1 | 1/2001 | Tarpenning et al. |
| 6,195,679 B1 | 2/2001 | Bauersfeld et al. |
| 6,195,694 B1 | 2/2001 | Chen et al. |
| 6,199,082 B1 | 3/2001 | Ferrel et al. |
| 6,205,455 B1 | 3/2001 | Umen et al. |
| 6,230,171 B1 | 5/2001 | Pacifici et al. |
| 6,239,792 B1 | 5/2001 | Yanagisawa et al. |
| 6,262,719 B1 | 7/2001 | Bi et al. |
| 6,271,840 B1 | 8/2001 | Finseth et al. |
| 6,279,005 B1 | 8/2001 | Zellweger |
| 6,279,014 B1 | 8/2001 | Schilit et al. |
| 6,289,362 B1 | 9/2001 | Van Der Meer |
| 6,301,590 B1 | 10/2001 | Siow et al. |
| 6,321,244 B1 | 11/2001 | Liu et al. |
| 6,331,867 B1 | 12/2001 | Eberhard et al. |
| 6,335,727 B1 | 1/2002 | Morishita et al. |
| 6,340,967 B1 | 1/2002 | Maxted |
| 6,356,287 B1 | 3/2002 | Ruberry et al. |
| 6,369,811 B1 | 4/2002 | Graham et al. |
| 6,389,434 B1 | 5/2002 | Rivette et al. |
| 6,393,422 B1 | 5/2002 | Wone |
| 6,405,221 B1 | 6/2002 | Levine et al. |
| 6,421,065 B1 | 7/2002 | Walden et al. |
| 6,446,110 B1 | 9/2002 | Lection et al. |
| 6,460,058 B2 | 10/2002 | Koppolu et al. |
| 6,486,895 B1 | 11/2002 | Robertson et al. |
| 6,490,603 B1 | 12/2002 | Keenan et al. |
| 6,493,006 B1 * | 12/2002 | Gourdol et al. ............. 345/825 |
| 6,535,294 B1 | 3/2003 | Arledge, Jr. et al. |
| 6,539,370 B1 | 3/2003 | Chang et al. |
| 6,549,220 B1 | 4/2003 | Hsu et al. |
| 6,560,621 B2 | 5/2003 | Barile |
| 6,571,295 B1 | 5/2003 | Sidana |

OTHER PUBLICATIONS

Kunikazu, T., Patent Abstracts of Japan, Publication No. 11327789 for Color Display and Electronic Blackboard System, published Nov. 30, 1999.

Open eBook Forum, Open eBook™ Publication Structure 1.0, Sep. 1999 http://www.ebxwg.org/oebps/oebps1.0/download/oeb1-oebps.htm.

Kristensen, A., "Formsheets and the XML Forms Language" (Mar. 1999).

Dublin Core Resource Types: Structurality DRAFT: Jul. 24, 1997, Feb. 27, 1998.

Dublin Core Metadata Element Set, Version 1.1: Reference Description 1999.

Dublin Core Metadata Initiative: User Guide Working Draft Jul. 31, 1998 1999.

SOFTBOOK® Press, The Leader in Internet–Enabled Document Distribution and Reading Systems: 1999 http://www.softbook.com/consumer/reader.asp.

Rocket eBook Using the Rocket eBook, 1999; http://www.rocket.com/Products/Faq/using.html.

Explore the Features of the Rocket eBook; wysiwyg://212http://www.rocketbook.com/Products/Tour/index.html; publication date unknown, prior to filing application.

Computer Networks and ISDN Systems "Responsive interaction for a large Web application: the meteror shower architecture in the WebWriter II Editor", 1997, pp. 1508–1517.

Hirotsu et al., "Cmew/U—A Multimedia Web Annotation Sharing System", NTT Network Innovation Laboratories—Japan, IEEE, 1999, pp. 356–359.

Kuo et al., "A Synchronization Scheme for Multimedia Annotation", Multimedia Information Networking Laboratory, Tamkang University—Taiwan, IEEE, 1997, pp. 594–598.

aha! InkWriter™ The simplicity of pen and paper, the power of word processing., Advertisement, 1983, 2 pp., aha! software corporation, Mountain View, CA.

aha! InkWriter™ for Magic Cap "The fastest, most convenient way to create faxes, notes and messages." Advertisement, 1994, 1995, 2 pp., aha! software corporation, Mountain View, CA.

aha! 2.0 for Windows InkWriter™ The power of word processing, the convenience of pen and paper, Advertisement, 1994, 1995, 2 pp., aha! software corporation, Mountain View, CA.

aha! software products, Web Page List of Products, Sep. 24, 1997, pp. 1–5, aha! software corporation, Mountain View, CA.

Schilit et al., "Digital Library Information Appilances", Association for Computing Machinery, XP000889731, Jun. 23, 1998, e–mail: (Schilit,price,gene) @pel.xerox.com. pp. 217–226.

* cited by examiner

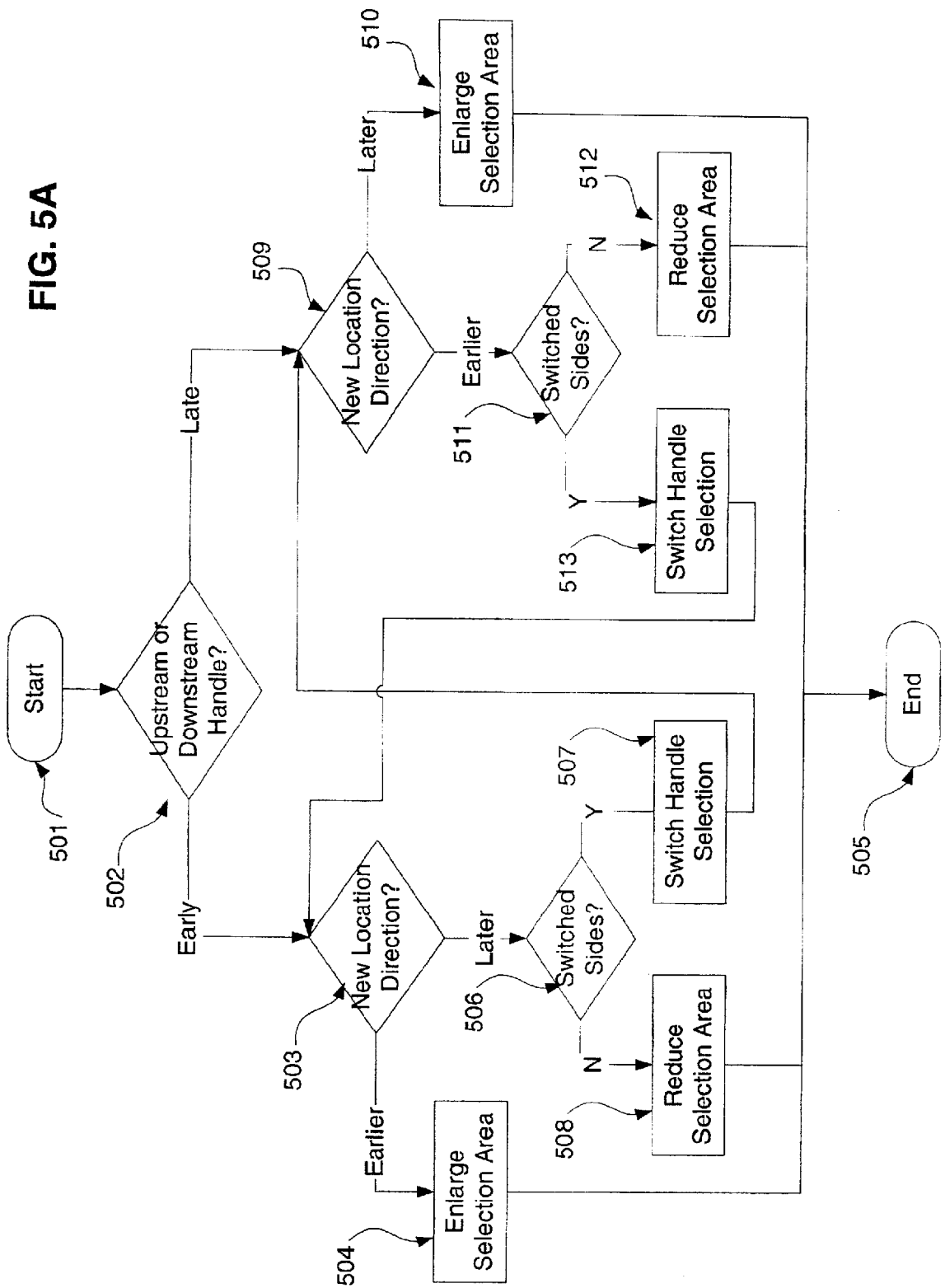

In the Fig. 3 example, the English language is assumed, and the increase/decrease directions are determined based on the directional flow of the English language. In this directional flow, the up/down direction is resolved first, such that, for example, dragging to the left above the selection increases the selection area, but dragging to the left below the selection decreases the selection area. Such directional logic is dependent on the directional flow of the language, and will be readily apparent to one of ordinary skill in the art.

In the Fig. 3 example, the English language is assumed, and the increase/decrease directions are determined based on the directional flow of the English language. In this directional flow, the up/down direction is resolved first, such that, for example, dragging to the left above the selection increases the selection area, but dragging to the left below the selection decreases the selection area. Such directional logic is dependent on the directional flow of the language, and will be readily apparent to one of ordinary skill in the art.

In the Fig. 3 example, the English language is assumed, and the increase/decrease directions are determined based on the directional flow of the English language. In this directional flow, the up/down direction is resolved first, such that, for example, dragging to the left above the selection increases the selection area, but dragging to the left below the selection decreases the selection area. Such directional logic is dependent on the directional flow of the language, and will be readily apparent to one of ordinary skill in the art.

FIG. 6C

SELECTION HANDLES IN EDITING ELECTRONIC DOCUMENTS

CROSS REFERENCE TO RELATED APPLICATIONS

The present application claims priority to U.S. Provisional Patent Application Ser. No. 60/247,973, entitled Selection Handles in Editing Electronic Documents, filed Nov. 10, 2000, which is hereby incorporated by reference as to its entirety. The present application is also related to application Ser. No. 60/247,182, entitled Method and Apparatus For Improving the Appearance of Digitally Represented Handwriting, filed on Nov. 10, 2000; to application Ser. No. 60/247,841, entitled Highlevel Active Pen Matrix, and filed on Nov. 10, 2000; to application Ser. No. 60/247,842, entitled Insertion Point Bungee Space Tool, and filed on Nov. 10, 2000; to application Ser. No. 60/247,844, entitled Simulating Gestures of a Mouse Using a Stylus and Providing Feedback Thereto, and filed on Nov. 10, 2000; to application Ser. No. 60/247,400, entitled System and Method For Accepting Disparate Types Of User Input, and filed on Nov. 10, 2000; to application Ser. No. 60/247,972, entitled In Air Gestures, and filed on Nov. 10, 2000; to application Ser. No. 60/247,831, entitled Mouse Input Panel Windows Class List, and filed Nov. 10, 2000; to application Ser. No. 60/247,843, entitled Mouse Input Panel and User Interface, and filed Nov. 10, 2000; to application Ser. No. 60/247,479, entitled System and Method For Inserting Implicit Page Breaks, and filed on Nov. 10, 2000; to application Ser. No. 09/763,170, entitled High Level Active Pen Matrix, and filed on Dec. 15, 2000; to application Ser. No. 09/741,107, entitled Mode Hinting/Switching, and filed on Dec. 21, 2000; to Application Ser. No. 60/247,847, entitled Tablet Computer and its Features, and filed on Nov. 10, 2000; and to Application Ser. No. 09/750,288, entitled Anchoring, Rendering, Reflow, & Transformations, filed Dec. 29, 2000, each of which is incorporated by reference herein as to their entireties.

TECHNICAL FIELD

Aspects of the present invention relate generally to user interfaces for computer systems. Further aspects relate to providing computer users with improved visual feedback when editing electronic documents on a computer. Yet further aspects relate to improved visual feedback responsive to user selections.

BACKGROUND OF THE INVENTION

The use of computers and/or computing systems to generate textual documents has become an established practice in today's Computer Age. Through the use of a computer, such as a personal computer, and a keyboard (e.g., one having the "QWERTY" key configuration), it is now possible for users to type and create documents of many different types and formats.

Various word-processing programs also provide a certain amount of visual feedback, through a user interface, to provide the user with visual cues as to the effects of the user's actions. For example, in generating an electronic document using the "MICROSOFT WORD" program, which is a word-processing product offered by Microsoft Corporation, many visual cues are provided. One such visual cue is generated when the user selects a portion of a textual document for editing. In typical prior art word processing systems, the user selects a portion of text (for editing, deleting, copying, etc.) by positioning a cursor at one end of the desired selection range of text, and clicking and dragging the cursor to a second selection point, thereby selecting the text in between the selection points. Alternatively, the user may use combinations of keypresses on a keyboard (such as holding a Shift key while pressing an arrow key). These methods of selecting text are cumbersome, and often lead to inaccurate selections. For example, a user might inadvertently place the cursor at an incorrect location (e.g., one space too far) in initially placing the cursor. Upon realizing the mistake, the user cannot edit this initial location, but must rather restart the selection process.

One prior art approach to easing this cumbersome process is found in the "WINDOWS" operating system, offered by Microsoft Corporation. In the WINDOWS system, a user may use a mouse to position a cursor over a word, and press a mouse key (e.g., "clicking") twice to select the entire word. The user may also press the key three times in succession to, for example, select an entire paragraph. While these alternatives are helpful when the user wishes to select a single word, sentence, or an entire paragraph, they are not sufficient to address the full range of selection possibilities. For example, a user might want to select multiple words, multiple paragraphs, or portions of one or more sentences or paragraphs. The successive clicking technique is insufficient to meet these needs. Furthermore, using the successive clicking technique, a user might depress his or her mouse button hundreds, or even thousands, of times a day. This places an undesirable amount of stress on the user's hands and body.

Accordingly, there is presently a need for an improved computer system and process by which users may quickly and efficiently make and/or adjust desired selections of portions of electronic documents.

SUMMARY OF THE INVENTION

Aspects of one or more embodiments of the present invention provide a modified form of user feedback when the user edits an electronic document by selecting and/or highlighting portions of the document.

Further aspects include providing one or more graphical handles on a graphical indicator of selected words and/or items. In further aspects, graphical selection handles persist after making the initial selection, and may be used by the user to resize and/or adjust the selection area as desired.

In further aspects, the automatic selection of a word or item in an electronic document may result in a highlight of the selected item/word, as well as one or more selection handles to allow the user to resize and/or adjust the selection beyond the initial selection.

In yet further aspects, the resizing of a selection may be made in accordance with a directional flow of the language of a textual selection.

Additional aspects include a selection handle rotation tool that allows for the rotation of a selection area.

Additional aspects and embodiments will be apparent in view of the following description and figures.

BRIEF DESCRIPTION OF THE FIGURES

FIGS. 5a–b show sample process flow diagrams for resizing a selection area in accordance with one embodiment of the present invention.

FIGS. 6a–c show an example usage of one embodiment of the present invention.

DETAILED DESCRIPTION OF EMBODIMENTS OF THE INVENTION

Figure 1:
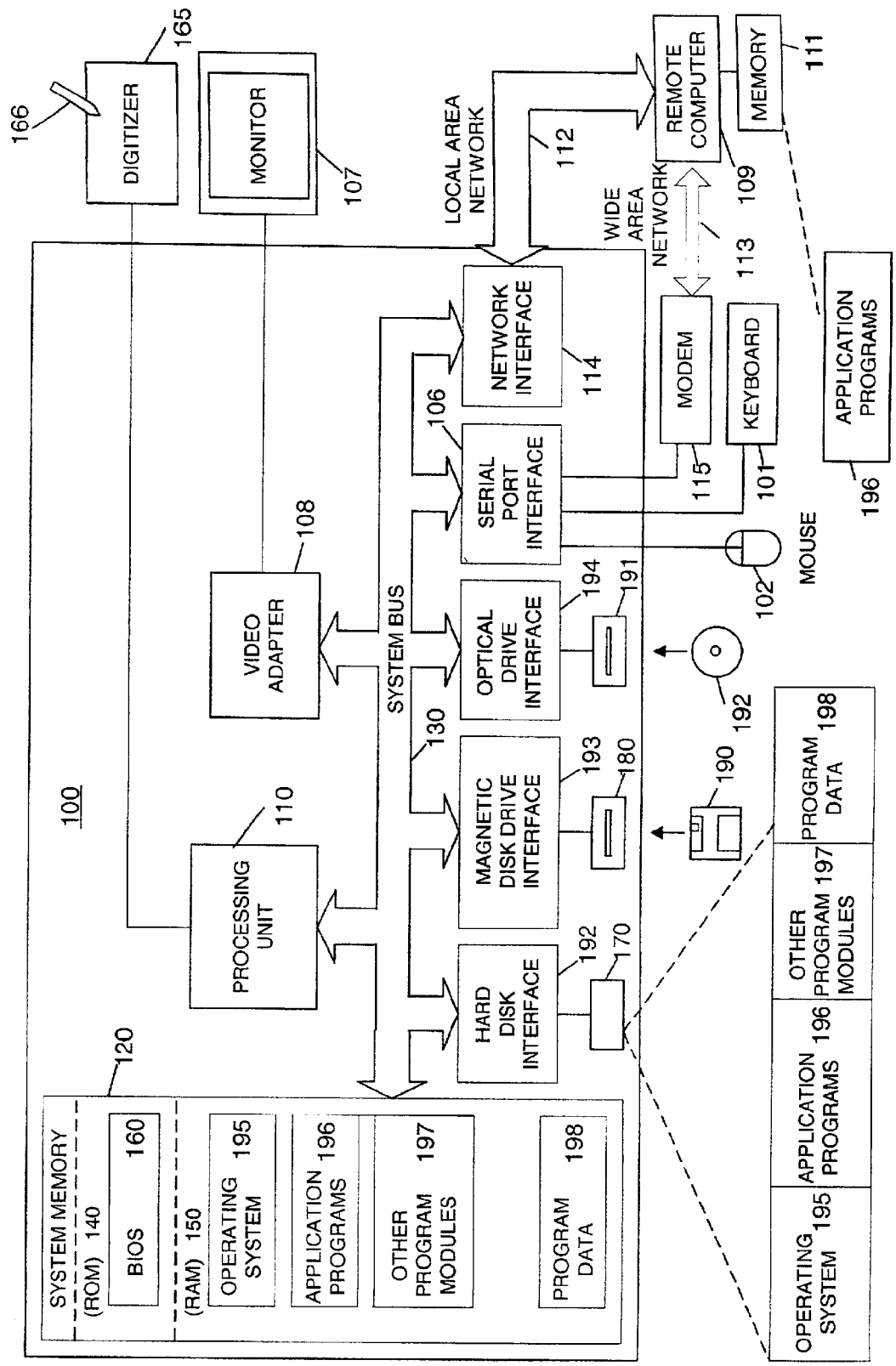
FIG. 1 shows a computing environment in which one or more aspects of the present invention may be implemented.

The present invention may be more readily described with reference to FIGS. 1–7c. FIG. 1 illustrates a schematic diagram of a conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the processing unit 110 is shown, in practice, the pen digitizer 165 may be coupled to the processing unit 110 via a serial port, parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are examples and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Although the FIG. 1 environment shows an example environment, it will be understood that other computing environments may also be used. For example, one or more embodiments of the present invention may use an environment having fewer than all of the various aspects shown in FIG. 1 and described above, and these aspects may appear in various combinations and subcombinations that will be apparent to one of ordinary skill.

Figure 2:
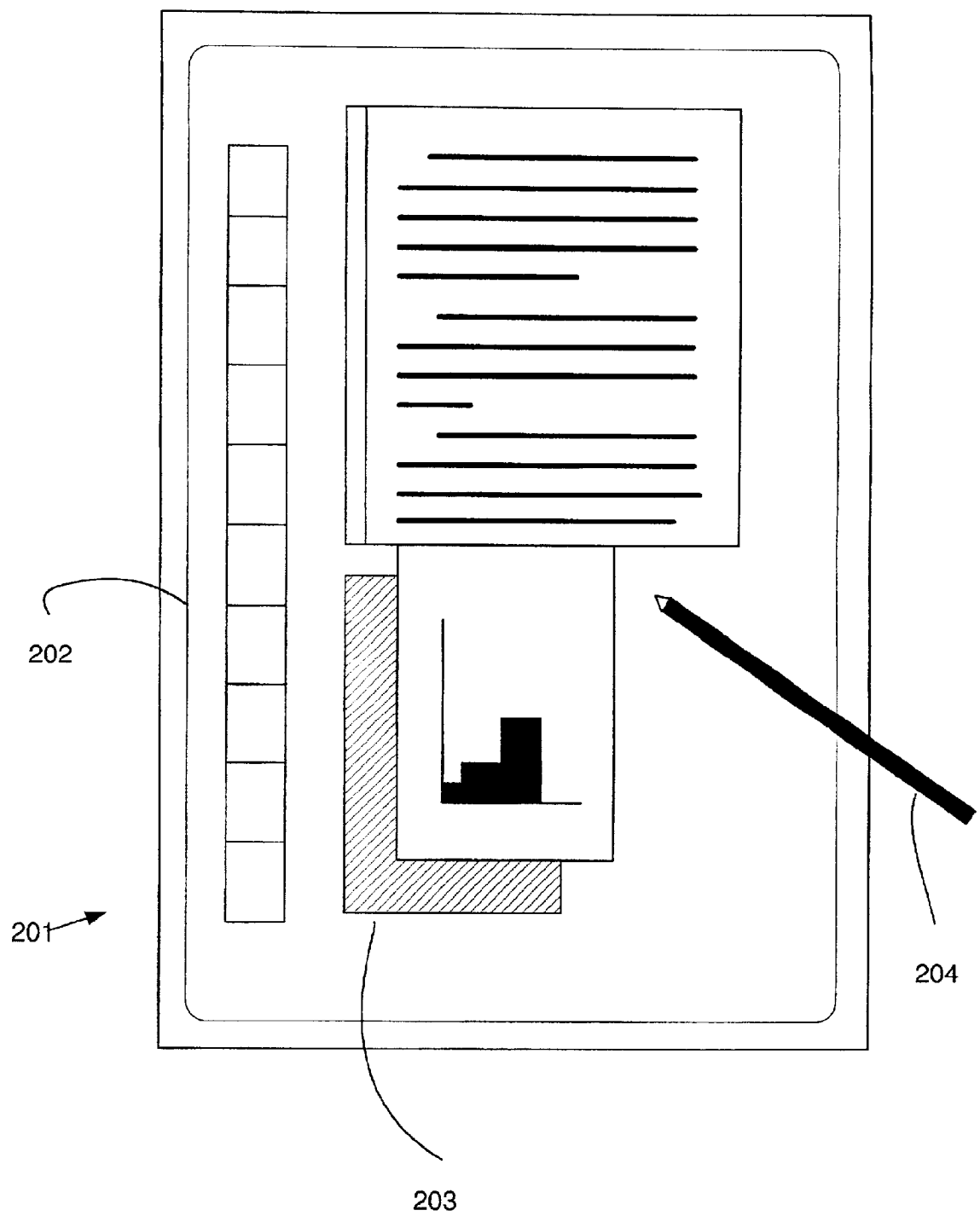
FIG. 2 shows an example of a tablet computing environment on which one or more embodiments of the present invention may be implemented.

FIG. 2 illustrates a tablet personal computer (PC) 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and write on the digitizing display area. Examples of suitable digitizing display panels include electromagnetic pen digitizers, such as the Mutoh or Wacom pen digitizers. Other types of pen digitizers, e.g., optical digitizers, may also be used. Tablet PC 201 interprets marks made using stylus 204 in order to manipulate data, enter text, and execute conventional computer application tasks such as spreadsheets, word processing programs, and the like.

A stylus could be equipped with buttons or other features to augment its selection capabilities. In one embodiment, a stylus could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be used for selecting or indicating portions of the displayed image on a touch-sensitive or proximity-sensitive display. Consequently, the term "user input device", as used herein, is intended to have a broad definition and encompasses many variations on well-known input devices.

Figure 3:
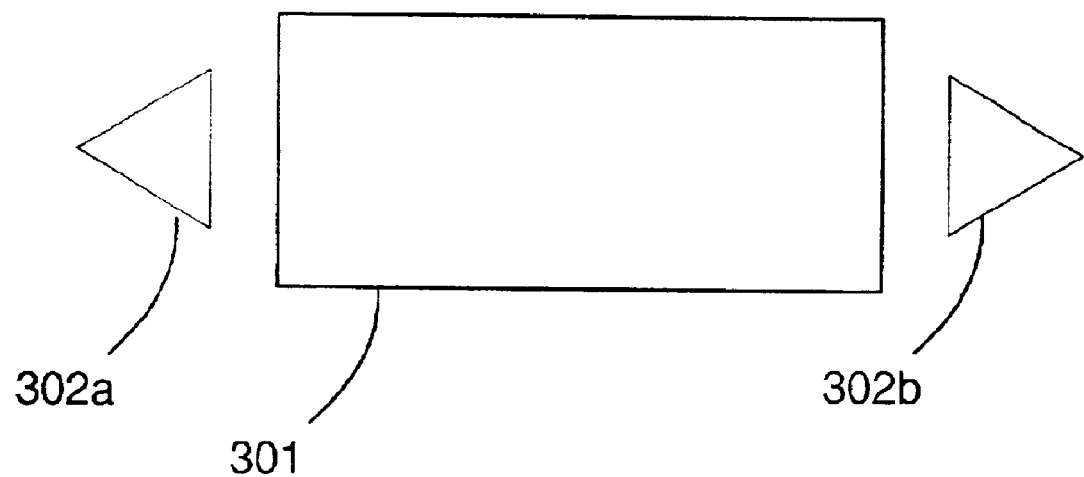
FIG. 3 shows select flow directions in accordance with one embodiment of the present invention.

FIG. 3 depicts a selection area (or selection tool) according to one embodiment of the present invention. The tool may include body 301 and one or more selection handles 302a, b. The body 301 of the selection area may be of any shape, and in the depicted example, is rectangular to account for selected electronic data, such as text, in a document. The body 301 may have an appearance that is distinguishable from non-selected portions and/or items on the electronic document to distinguish selected portions from non-selected portions. Accordingly, the selection body 301 may be an inverse color of the selected text (where the selected text becomes inverted in color as well), a shape (such as a rectangle) enclosing the selected area, an underlining, or any other form of highlighting. The body 301 may alternatively be of a predefined color, and may be translucent or transparent to allow reading of selected/highlighted text. Selection body 301 represents the selected portions of data, and in further embodiments, may simply be defined as an area between the selection handles 302a, b.

The selection handles 302 generally allow the user to resize and/or adjust the selection of a portion of data, while maintaining the selection. In some embodiments, the selection handles 302 may be graphical symbols that may be moved to resize a selection body 301. For selecting text, the dragging of a selection handle 302 may increase or decrease portions of the current selection body 301, depending on the particular handle being moved, the direction in which the handle 302 is moved, and the directional flow of the language of the underlying text. Movement of one or more selection handles 302 may be accomplished in many ways, such as clicking and dragging with a mouse, tapping and dragging with a stylus pen, pressing one or more keys on a keyboard, or any other known method for moving a graphical icon.

"Directional flow" of a language generally refers to the linear order in which a reader of the particular language reads symbols and/or groups of symbols (e.g., text) according to the grammatical rules of the language. For example, text in most (if not all) languages is read (for example, aloud) in a linear format. This linear format is represented by the line in FIG. 4a, and may be referred to as a "stream," in which the reading of the line is from "upstream" to "downstream". While reading (or speaking) such languages occurs linearly, the written presentation of such languages is generally not in the form of a long, single line. Instead, most languages bend and/or break this line up to fit on a two-dimensional format, such as a piece of paper or on a computer screen.

For example, the written English language breaks this line into rows, where the text within a row is read left to right, and the rows are read top to bottom. Such a presentation is shown in FIG. 4b. Other languages may break the line and present columns, instead of rows. For example, the Chinese language commonly breaks the text into vertical columns that are read top to bottom, with columns being placed right to left. FIG. 4c shows such a flow. Still other languages might choose not to break the line, and may instead wrap or wind the line. FIG. 4d shows such a flow.

Regardless of their particular directional flow, each of these languages ultimately reads text in a linear, sequential, "stream" format. This linear format may be referred to herein as a "stream", which will be used below to describe text selection according to one or more example embodiments of the present invention.

In one embodiment of the present invention, the directional flow of the underlying language may be configured through the selection of a particular flow and/or an identification of a language (e.g., English, Chinese, etc.). This selection may be manual (e.g., performed by user selection), or the selection of a language/directional flow may be carried out through character/language recognition software. The directional flow of the language will be beneficial in interpreting movements of the selection handles of a selection area body 301.

In example embodiments of the present invention, selection handles for a text selection appear on opposite sides of the selection, and in line with the directional flow of the underlying language. In such embodiments, one or more selection handles may be located at or near the "upstream" end of a selection area, while one or more other selection handles may be located at or near the "downstream" end of a selection area. In some embodiments, the various selection handles themselves define the selection area.

FIG. 5 shows a process that may be used, in one example embodiment, to resize a selection area when a selection handle 302 is moved. FIG. 5a shows a basic process in which a selection handle 302 is moved when selecting text. In a text selection tool, and using the FIG. 3 example with the English language, selection handle 302a may be considered to be an "upstream" handle, while selection handle 302b may represent a "downstream" handle.

Figure 5B:
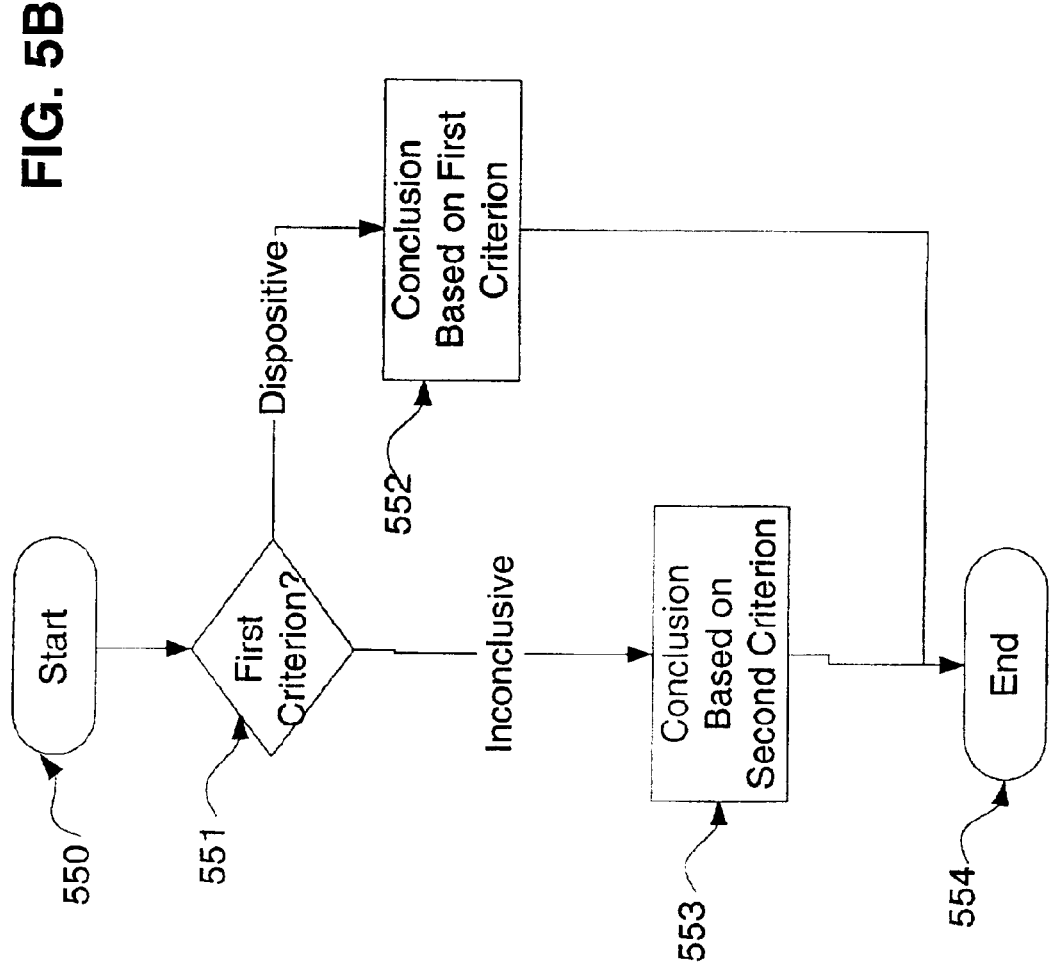

The process begins in step 501 when movement of a selection handle 302 is detected. In step 502, a determination is made as to whether an "upstream" handle or a "downstream" handle was moved. This determination will be helpful in interpreting the movement of the selection handle and resizing the selection area represented by selection body 301. FIG. 5b, discussed further below, illustrates an example process for determining whether a first position is upstream or downstream relative to a second position.

If an upstream handle was moved, then in step 503, the new location of the upstream handle is compared with its old location. If the new location is further upstream than the old location, then the selection area represented by selection body 301 is enlarged in step 504 to encompass the additional text located between the body 301 and the selection handle at its new location. To illustrate, such an enlargement might occur if the user were to move selection handle 302a to the left and/or upwards in FIG. 3. The process may then conclude in step 505.

If, in step 503, the new location of the upstream handle is in the downstream direction, then the process moves to step 506, in which a determination is made as to whether it will be necessary to logically exchange handles. Logically speaking, if a selection area is defined as the text between the selection handles, moving an upstream handle (e.g., 302a, if using the English language) in the downstream direction reduces the selection area. However, after the upstream selection handle (e.g., 302a) is moved so far downstream that it passes the downstream handle (e.g., 302b), further movement of the selection handle in the downstream direction no longer reduces the size of the selection area, but rather increases the size. To account for this in an example embodiment of the present invention, the logic for interpreting the movement of a selection handle changes if one selection handle is moved toward, and then beyond, an opposite selection handle. Such switching allows the process to logically treat a broader range of handle movements.

To make this determination, the new location of the upstream handle is compared, in step 506, with the existing location of the downstream handle. If the new location of the upstream handle is further downstream than the original downstream handle, then the process moves to step 507. In step 507, it is determined that the movement of the upstream handle should be interpreted as if the downstream handle were moved.

Step 507 logically switches the selection handles such that the moved selection handle, formerly considered the upstream handle, is now considered a downstream handle. Furthermore, the process may then assume that the now-renamed downstream handle (which has been moved to its new position) was moved from the current position of the original downstream handle (which was not moved, now renamed the upstream handle). To illustrate using the FIG. 3 example, a movement of selection handle 302a to a new location that is to the right of selection handle 302b would be viewed logically as having moved selection handle 302b to the new location.

In one embodiment, such a movement may also cause selection handle 302a to move to the location where selection handle 302b was originally located. In such an embodiment, the movement to the new location may be viewed as:: 1) moving selection handle 302a to the same point as selection handle 302b; 2) dropping selection handle 302a and picking up selection handle 302b; and 3) moving selection handle 302b to the new location. Such an embodiment may have the effect of unselecting the text previously selected, and may be advantageous to implement a desired intent of the user.

In an alternate embodiment, such a movement may simply return selection handle 302a to its original location, and treat the movement as if selection handle 302b had been selected in the first place. Such an embodiment may advantageously help a user avoid inadvertently deselecting an initial selection when resizing the selection area.

After switching, the process will move to step 509, in which it will be assumed that the downstream handle was moved from its original position to the new location.

If, after the comparison in step 506, switching is not needed, then the process moves to step 508, in which the body 301 may be reduced in size to select the text that exists between the selection handles 302 after the movement. The process then concludes in step 505.

If, in step 502, the downstream handle was moved, the process moves to step 509. In step 509, a determination is made as to whether the new position is upstream or downstream from the original position of the downstream handle. This step, and steps 510–513, are similar to steps 503–508 discussed above, but apply to movement of a downstream handle.

If, in step 509, the downstream handle was moved further downstream, then the process moves to step 510 to enlarge the selection area. An example of such movement occurs when, referring to FIG. 3 and using the English language, downstream handle 302b is moved further to the right.

If, in step 509, the downstream handle was moved further upstream, then the process moves to step 511 to determine whether it is necessary to exchange handles. Similar to step 506 described above, step 511 involves a comparison of the new location of the downstream handle with the upstream handle (which was not moved). If the downstream handle was moved further upstream than the original upstream handle, then a switch will occur in step 513 such that the downstream handle is now treated as the upstream handle. After the switch, the process moves to step 503 to resolve the movement of the now-renamed upstream handle.

If, in step 511, the new location of the downstream handle is still further downstream than the upstream handle, then the process moves to step 512, in which the selection area is reduced in size corresponding to the relocated downstream handle such that the text between the upstream and downstream handles is selected. The process then concludes in step 505.

The FIG. 5a process includes determinations as to whether a selection handle has been moved "upstream" or "downstream", and FIG. 5b depicts an exemplary process flow for determining whether a second location of a selection handle is "upstream" or "downstream" from an original location. In most cases, this determination can be resolved using two criteria. The first criterion, depending on the directional flow of the language, will be the more dispositive one (if the language has such a criterion). For example, in languages following the FIG. 4b or 4d directional flow, locations in a vertically higher row are always "upstream" from locations in lower rows. In the FIG. 4c flow, locations in right-most columns are always "upstream" from locations in columns to the left. Accordingly, the first criterion is considered in step 551, and if it is possible to resolve the issue using the first criterion alone (e.g., in English, the two positions are in different horizontal rows), then the process moves to step 552 to make the upstream/downstream determination using the first criterion.

If the first criterion is insufficient, however (e.g., in English, the two positions are in the same horizontal row), then the process moves to step 553 to consider a second criterion. The second criterion is also defined depending on the particular language. For example, languages having the FIG. 4b flow may have a second criterion stating that within a row, text to the left is upstream from text to the right. In the FIG. 4c flow, the second criterion may state that text with a higher vertical location within the same column is upstream from text in a lower position. In the FIG. 4d flow, the second criterion may be similar to the second criterion for the FIG. 4b flow, but alternating from one row to the next. In step 553, the second criterion is dispositive for languages having any of directional flows 4a–c, and the process concludes at step 554. In alternate embodiments, however, different languages may require additional criterion to make the upstream/downstream determination.

Figure 4A:
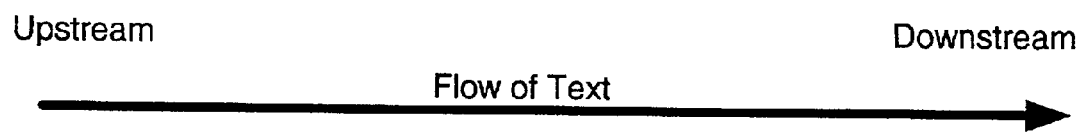
FIGS. 4a–d show sample directional flows for languages.
Figure 4B:
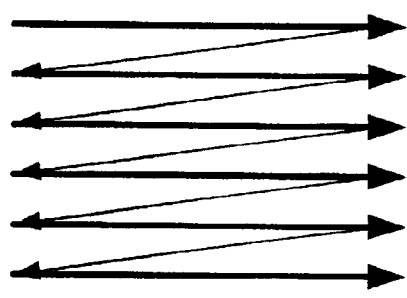
Figure 4C:
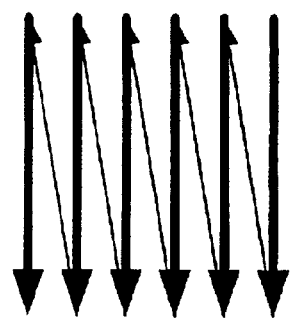
Figure 4D:
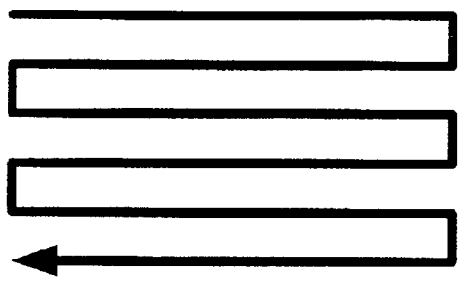

Using the FIG. 4a flow, a second criterion would be horizontal position within a row. However, this second criterion is only needed if the positions being compared are located in the first row. Such is the case in English, in which a first word is always upstream from any other word that is in the same row, and to the right of the first word.

FIGS. 6a–c depict various steps in which electronic data in the form of an example text paragraph may be edited and/or modified using one or more aspects of the present invention. First, as shown in FIG. 6a, the user might select a single word within the paragraph by, for example, tapping a stylus on the word. Upon selection, the selection area 601 appears, indicating the selected word. The selection area, however, includes selection handles 602a,b. If the user wishes, the user can then select a selection handle 602 (for example, by tapping or holding), and drag the handle to expand and/or collapse the selection area 601 as desired. In the FIGS. 6a–c example, the right-side selection handle 602b is selected and dragged down to its position as shown in FIG. 6b. In accordance with the directional flow of the English language, and the process steps described above, this downward movement may be interpreted to mean an increase in the selection area 601, resulting in an enlarged area as shown in FIG. 6b. Upon releasing the handle by, for example, lifting the stylus from the tablet, the resized selection area 601 remains, as shown in FIG. 6b. As shown in FIG. 6b, if the user resizes the selection area 601 to more than one line, the selection handles 602a,b may remain at either end of the selection area.

In one example embodiment, the selection handles remain at opposite ends of the highlight area, and in line with the directional flow of the underlying language of text. In this manner, the selection handles may allow expanding a selection area backwards or forwards within the flow of the text. However, alternate embodiments may include additional handles around a periphery of the highlight area. Such additional handles may give users greater flexibility in resizing a selection area.

As stated above, releasing the selection handle 602 causes the resized selection area 601 to appear. Alternatively, the selection area 601 may resize itself automatically, and dynamically, as the user moves the selection handle 602 through the document. Such an alternate embodiment may be advantageous for providing real-time feedback to the user regarding the selected data. If, after resizing the selection area 601, the user wishes to further resize the area, the user can simply drag once again on a selection handle. In FIG. 6c, the user has dragged the other selection handle 602a to expand the selection further in the opposite direction from the first expansion. The selection area may be resized and adjusted according to the user's desire, and when finished, the selection area may be removed by any number of ways, such as tapping elsewhere on the tablet and/or document, pressing a key, selecting a cut/copy/delete/paste feature, etc.

Although the above examples are given beginning with a stylus tap to select a word, it will be understood that the selection handles and selection areas described may also exist for any other type of highlight and/or selection area, regardless of how it was generated. For example, a user may tap between words, and drag the stylus across a portion of a document and/or paragraph. The portion over which the user dragged the stylus may be highlighted by a selection area, and this selection area may also have one or more selection handles as described. Alternatively, a user might use a mouse to triple-click on a word to select a paragraph, and then use the selection handles to resize the selection area initially surrounding the paragraph. A mouse may also be used to move a selection handle as described above to resize a selection area.

Figure 7A:
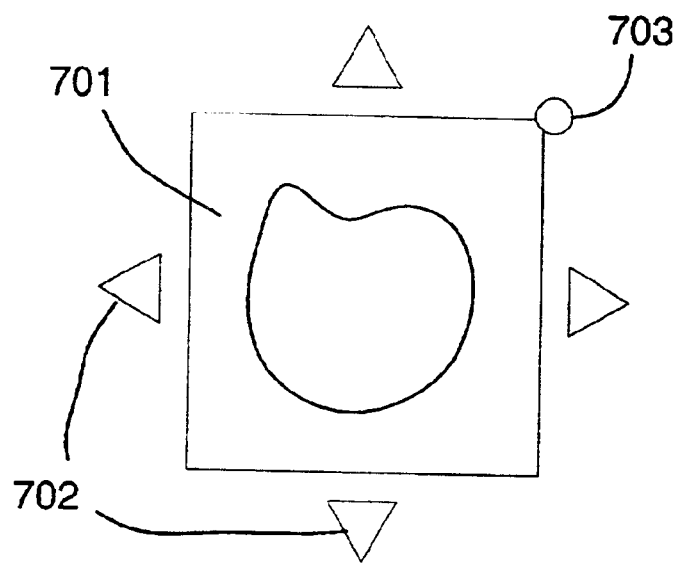
FIGS. 7a–b show further embodiments of the present invention.
Figure 7B:
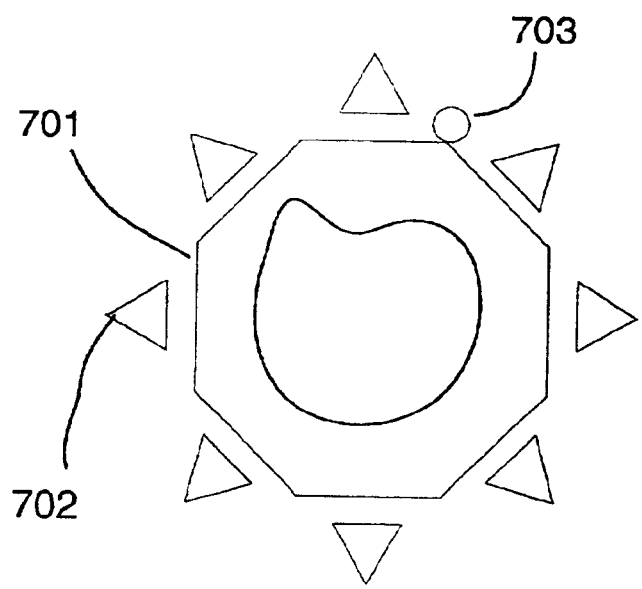

Selection areas are not limited to selecting text, as other forms of electronic data may also be selected. For example, FIGS. 7a–b show screens having graphical image objects. The user may select an image by tapping it with a stylus, clicking with a mouse pointer, etc., and an image selection area 701 may appear, surrounding the selected image object.

The image selection area may include selection handles 702 that operate in a similar fashion as the text selection discussed above. Additionally, the image selection area may also include one or more additional image object handles 703 that may offer additional controls for selected image objects. For example, additional handle 703 may be a rotational tool that allows the user to rotate the selection area 701 and/or selected objects. Other examples include handles for changing the orientation of individual objects, reversing selected objects, accessing display characteristics of image objects (such as color, line width, fill, transparency, etc.), and other configuration options known to image objects. Such additional tools may help simplify a user's efforts in editing electronic data.

Figure 8A:
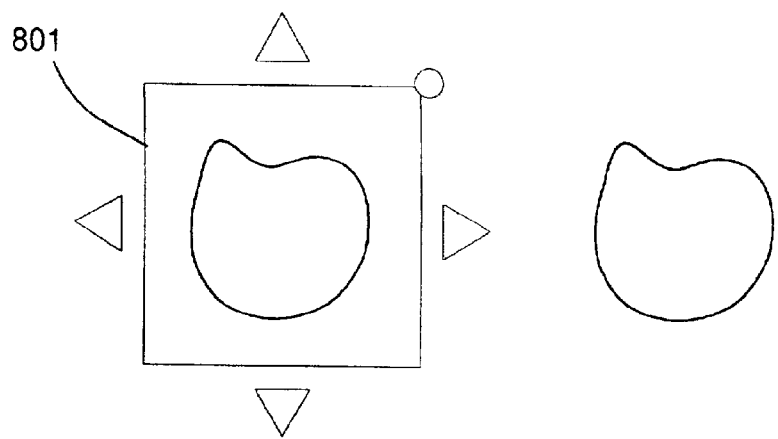
FIGS. 8a–c show a sequence of screens according to a further example embodiment of the present invention.
Figure 8B:
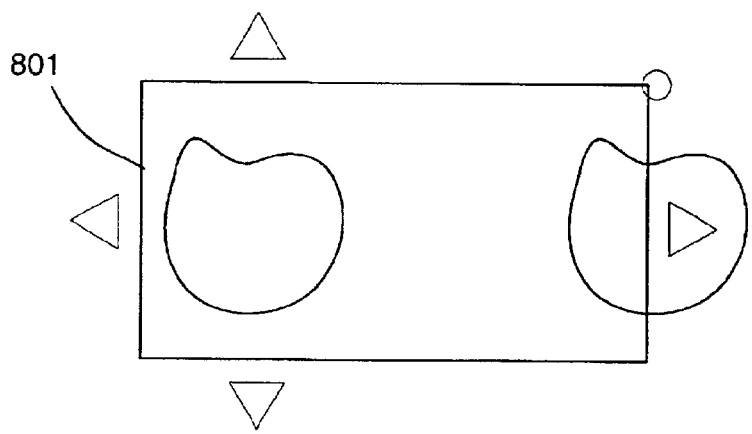
Figure 8C:
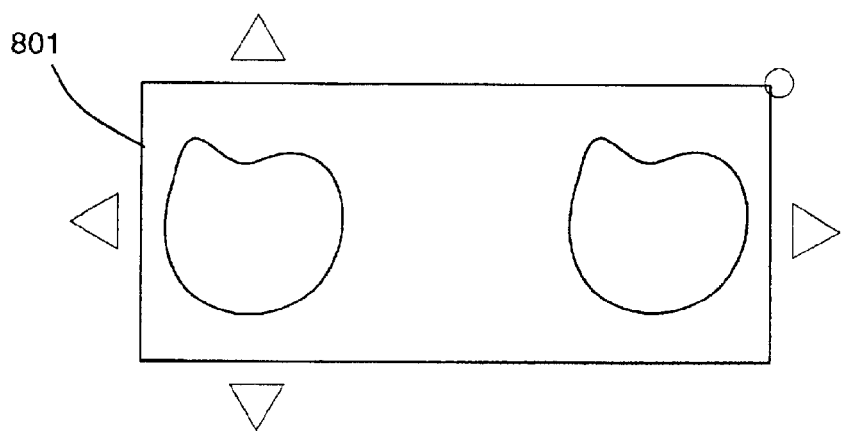

The selection area 701 may be generated in any number of predefined shapes, with any number of available selection handles 702 suitable for resizing. As a user resizes the selection area 701, the computer may determine what objects are surrounded or encountered by the selection area 701, and may add these objects to the selection area. The selection area may also be expanded to encompass these objects, as shown in FIGS. 8a–c. After resizing the first time, the selection area 801 remains, and can be subsequently resized by the user. In further aspects, the user may cease resizing as shown in FIG. 8b, and the computer device may automatically resize the area 801 to encompass the object that was encountered by the user's resized area, as shown in FIG. 8c.

The discussion above provides example aspects and embodiments of the present invention, but the invention is not limited to the particular configurations disclosed. Rather, the disclosed embodiments are merely example embodiments. Those skilled in the relevant arts will readily appreciate the fact that many variations to the disclosed embodiments may be made without departing from the spirit and scope of the present invention. For example, one or more of the disclosed aspects or embodiments may be combined with one or more other aspects or embodiments.

What is claimed is:

1. A method for selecting portions of electronic data on a display device, comprising the steps of:

generating a selection area identifying a first portion of said electronic data, wherein said selection area includes a plurality of selection handles, said selection handles being peripherally disposed to said selection area;

receiving an input from a user associated with said selection handles for detecting a movement of one of said selection handles from on said display; and determining whether said movement is associated with an upstream indication or a downstream indication;

resizing said selection area among said selection handles while maintaining a selection of said portions of the electronic data responsive to said step of determining and said user input.

2. The method of claim 1, wherein said electronic data is text data.

3. The method of claim 2, wherein said step of receiving an input further comprises the step of said user selecting and dragging said one of said selection handles.

4. The method of claim 3, wherein said display device is a tablet personal computer, and said step of said user selecting and dragging is performed using a stylus.

5. The method of claim 2, wherein said step of resizing is performed in accordance with a directional flow of a language of said electronic data.

6. The method of claim 1, wherein said electronic data includes one or more graphical image objects.

7. The method of claim 1, wherein said electronic data identified by said selection area is displayed in a different color from electronic data not identified by said selection area.

8. A computer-readable medium having computer-executable instructions for performing the steps recited in claim 1.

9. A method for selecting portions of electronic data on a display device, comprising the steps of:
displaying a selection area identifying a first portion of said electronic data, wherein said selection area includes two graphical selection handles on opposing ends of said identified selection area;
receiving an input from a user for movement of at least one of said graphical selection handles; and
resizing said selection area among said graphical selection handles responsive to said user input of movement of the least one graphical selection handle and while maintaining a position of the other said graphical selection handle.

10. The method of claim 9, further comprising the step of exchanging handles when a first of said selection handles is relocated to an opposite end of said selection area.

11. The method of claim 9, wherein said step of resizing is performed as said selection handle is relocated.

12. A method for selecting portions of electronic data on a display device, comprising the steps of:
generating a selection area identifying a first portion of said electronic data, wherein said selection area includes a plurality of graphic selection handles;
receiving an input from a user associated with a plurality of selection handles; and
resizing said selection area responsive to said user input, wherein said step of resizing further comprises the step of automatically resizing said selection area to select an entire image object when said user relocates said one of said selection handles over a portion of said image object.

13. The method of claim 12, wherein said selection area further includes an image object handle.

14. The method of claim 13, wherein said image object handle is a rotational tool for rotating said selected image object.

15. A portable computing device comprising a display area and a stylus, configured to:
display electronic text data on said display area;
detect a user selection of a portion of said text data using said stylus;
display a selection area identifying said selected portion of said text data, wherein said selection area includes first and second graphical selection handles on opposing ends of said selection area;
detect a user selection and upstream or downstream movement of said first selection handle; and
resize said selection area responsive to said user selection and detected movement of said first selection handle.

16. The device of claim 15, further configured to resize said selection area in accordance with a directional flow of a language of said text data.

17. The device of claim 15, further configured to automatically exchange selection handles when said user selects and moves said first selection handle to an opposite end of said selection area.

18. The device of claim 15, wherein said user selection of said portion of said text data is generated by double-tapping said stylus on said display area, and said portion of said text data is a single word.

19. The device of claim 15, wherein said user selection of said portion of said text data is generated by tapping and dragging said stylus on said display area.

20. The device according to claim 15, wherein said electronic text data comprises electronic ink.

* * * * *

UNITED STATES PATENT AND TRADEMARK OFFICE
CERTIFICATE OF CORRECTION

PATENT NO. : 6,891,551 B2
APPLICATION NO. : 09/768171
DATED : May 10, 2005
INVENTOR(S) : Keely et al.

It is certified that error appears in the above-identified patent and that said Letters Patent is hereby corrected as shown below:

On page 2, item (56), under "U.S. Patent Documents", in column 1, line 8, below "5,978,818 A   11/1999   Lin" insert -- 5,983,126 A   11/1999   Drews et al. --.

On page 2, item (56), under "Other Publications", in column 2, line 14, after "1998" insert -- , --.

On page 2, item (56), under "Other Publications", in column 2, line 16, after "Systems" delete ":" and insert -- ; --, therefor.

On page 2, item (56), under "Other Publications", in column 2, line 19, delete "rocket" and insert -- rocketbook --, therefor.

On page 2, item (56), under "Other Publications", in column 2, line 25, after "Editor"" delete "," and insert -- ; --, therefor.

On page 2, item (56), under "Other Publications", in column 2, line 39, delete "1994, 1995" and insert -- 1993, 1994 --, therefor.

On page 2, item (56), under "Other Publications", in column 2, line 48, delete "Appliances" and insert -- Appliances --, therefor.

On page 2, item (56), under "Other Publications", in column 2, line 50, delete "(Schilit,price,gene)" and insert -- {Schilit,price,gene} --, therefor.

On page 2, item (56), under "Other Publications", in column 2, line 50, delete "@pel.xerox.com." and insert -- @pal.xerox.com, --, therefor.

UNITED STATES PATENT AND TRADEMARK OFFICE
CERTIFICATE OF CORRECTION

PATENT NO. : 6,891,551 B2
APPLICATION NO. : 09/768171
DATED : May 10, 2005
INVENTOR(S) : Keely et al.

It is certified that error appears in the above-identified patent and that said Letters Patent is hereby corrected as shown below:

In column 1, line 30, delete "09/763,170" and insert -- 09/736,170 --, therefor.

In column 1, line 30, delete "High Level" and insert -- Highlevel --, therefor.

In column 7, line 40, after "as" delete "::" and insert -- : --, therefor.

Signed and Sealed this

Seventh Day of April, 2009

JOHN DOLL
*Acting Director of the United States Patent and Trademark Office*